United States Patent
Luo (10) Patent No.: US 7,660,944 B2
(45) Date of Patent: Feb. 9, 2010

(54) RANDOM NUMBER GENERATION

(75) Inventor: Lijun Luo, Abingdon (GB)

(73) Assignee: PLX Technology, Inc., Sunnyvale, CA (US)

( * ) Notice: Subject to any disclaimer, the term of this patent is extended or adjusted under 35 U.S.C. 154(b) by 370 days.

(21) Appl. No.: 11/880,880

(22) Filed: Jul. 24, 2007

(65) Prior Publication Data

US 2008/0022039 A1    Jan. 24, 2008

(51) Int. Cl.
 *G06F 12/00*    (2006.01)

(52) U.S. Cl. .................................................. 711/112
(58) Field of Classification Search ........................ None
 See application file for complete search history.

(56) References Cited

U.S. PATENT DOCUMENTS 6,799,255 B1 *   9/2004   Blumenau et al. ............ 711/152

\* cited by examiner

*Primary Examiner*—Brian R Peugh
(74) *Attorney, Agent, or Firm*—Harness, Dickey & Pierce, P.L.C.

(57) ABSTRACT

A controller for controlling the operation of a hard disk drive is capable of generating a random number using the hard disk drive. Initially the hard disk drive is disabled from performing a read-ahead operation. Random addresses on the hard disk drive are generated from the output of the pseudo-random number generator. Read-verify commands is sent to the hard disk drive to perform a read-verify operation of reading and verifying the data stored in the sectors of the hard disk drive at the random addresses without returning the data. The disk access times taken by the hard disk drive to access the sectors are measured. A deskewing process is performed on a plural number of disk access time measurements to generate a random number.

62 Claims, 2 Drawing Sheets

RANDOM NUMBER GENERATION

BACKGROUND OF THE INVENTION (1) Field of the Invention

The present invention relates to the generation of random numbers in a computer apparatus, suitable for example for use in secure cryptographic applications.

(2) Description of Related Art

Random numbers play an important role in secure cryptographic applications. At the heart of all cryptographic applications is the generation of a random number which is not known and is unguessable by an adversary. The random number must be suitably random that an adversary has a low probability of breaching the cryptographic system in a reasonable time by a systematic trial and error technique. In general terms, the required properties of the generated random number is that the distribution of numbers generated are uniform, unbiased, consistent, unpredictable, scalable and independent.

Current techniques for random number generation are summarised in the document Request for Comment No. 4086 of the Internet Society (June 2005). The basis of a random number generator is an entropy source and a deskewing process.

The entropy source is a source of varying numbers, which may be single bits, derived from the measurement of a physical phenomenon having some degree of randomness. In general, the varying numbers output from any given entropy source may be to some extent biased or skewed (so the distribution is not uniform) and/or correlated (so successive numbers are dependent on each other). A large number of entropy sources have been proposed for use in random number generation in a computer apparatus. Some examples of such known entropy sources are:

- an analog sound or video input which digitises a real-world analog source and derives randomness from noise such as thermal noise;
- the disk access time of a hard disk drive which is subject to randomness in the rotational speed due to chaotic air turbulence;
- the timing of a free-running ring oscillator in which randomness is derived from noise in the components; and
- the timing and special value of an event external to the computer apparatus, such as the movement of a mouse, the interrupt timing of a mechanical input/output device, keystroke and similar user events.

In general terms, it is clear that hardware-based entropy sources are better than other entropy sources. However, the degree of randomness available from any entropy source is limited. As mentioned above the random numbers derived directly from any entropy source has some degree of bias and/or correlation. This has the result that the output of the entropy source may have a non-uniform probability distribution or there may be some degree of correlation between successive outputs.

To deal with this, a deskewing process is performed on the output of the entropy source. The deskewing process reduces the bias and correlation in the output of the entropy source. Ideally, the deskewing process produces a uniform probability distribution with no correlation. A large number of deskewing processes are known, some examples being as follows:

- calculating the parity using an exclusive-OR function;
- applying a transition mapping such as a von Neumann mapping;
- performing a frequency transformation, for example a Fast Fourier Transform; and
- applying a reversible compression technique.

In general terms, the requirements of the random number generator are that it provides random numbers with a degree of randomness sufficiently high for the application concerned using an entropy source which is readily available in a computer apparatus. In general, any degree of randomness may be achieved from any given entropy source by taking a large enough number of measurements and applying a deskewing process to those measurements. For example, consider an entropy source which has a probability of 0.99 of outputting a value 1 and a probability of 0.01 of outputting a value 0. Merely using the simple deskewing process of performing an exclusive-OR operation, it is possible to obtain an output random bit which is within 0.1% of an equal probability of having a value 0 or 1 by applying the deskewing process to just over 300 measurements.

However, in practice there is a limitation that the random numbers should be generated in a time which is reasonable for the application concerned. Thus, the speed of generation of the random numbers is dependent not only on the nature of the entropy source and the rate at which measurements can be made, but also on the degree of randomness in the output of the entropy source. This is because the randomness affects the number of measurements needed to be combined in the deskewing process to produce an output random number with a sufficiently uniform distribution for the application concerned.

As previously mentioned, there are many choices of entropy source, but the present invention is concerned with use of the disk access time of a hard disk drive. Randomness in the disk access time arises as follows.

Figure 1:
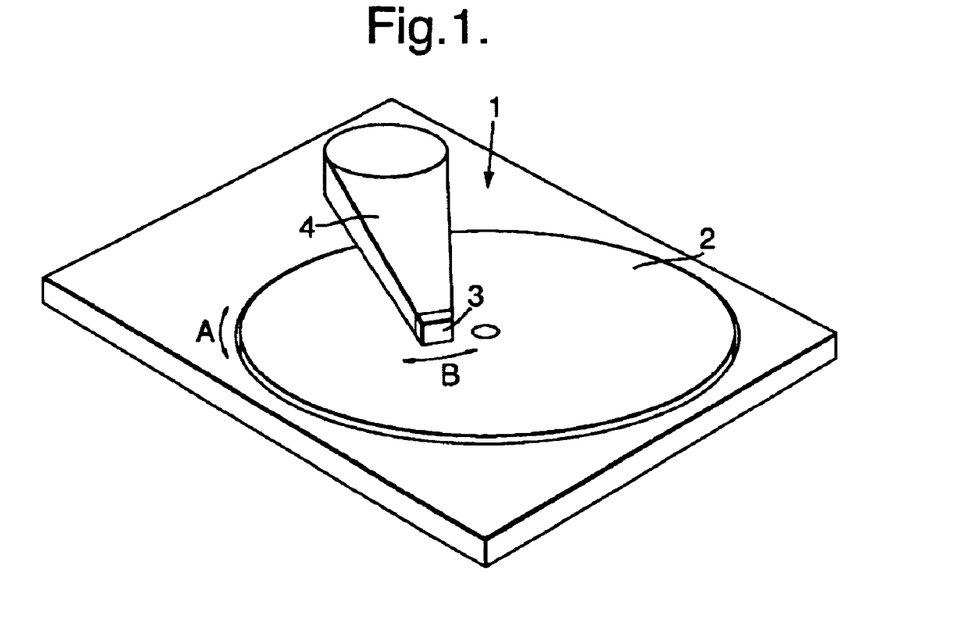
FIG. 1 is a perspective view of a hard disk drive.

Reference is made to FIG. 1 which shows a typical hard disk drive 1 comprising a rotatable platter 2 (or in general any number of platters) readable by a magnetic head 3 supported on the end of an actuator arm 4. During operation, the head 3 accesses different sectors on the platter 2 by means of (a) rotation of the platter 2 as shown by the arrow A so that the head 3 reads successive sectors of an annular track and (b) movement of the actuator arm 4 causing movement of the head 3 along an arc (roughly radially) inwardly and outwardly from the centre of the platter 2 as shown by arrow B. The movement of the actuator arm 4 to move the head 3 to different tracks is known as seeking and the time taken for the head 3 to move from one track to another is called the seek time.

The additional time needed for the platter 2 to rotate until the head 3 is at the sector with the desired address is known as the rotational delay or rotational latency. Due to air turbulence in the gap between the head 3 and the platter 2, the speed of rotation of the platter 2 is subject to a degree of randomness. That is to say, the air turbulence is chaotic and causes the rotational speed to vary. Thus disk accesses involving the same movement of the platter 2 and head 3 take different times. In principle, this makes the disk access time a good entropy source.

However, in practice, use of the disk access time of the hard disk time has the practical limitation of being relatively slow. In general terms, it would be desirable to improve the speed of generation of random numbers using the disk access time of a hard disk drive as an entropy source.

Another problem concerns the choice of address for the disk access. As the degree of randomness arises from the rotation of the platter 2, a disk accesses which maximise the rotational latency should be chosen. However, in practice it is difficult to determine disk accesses which achieve this. For different types of hard disk drive 1, the layout of sectors on the platter 2 and the speed of rotation of the platter 2 is not standardised and varies. Thus disk accesses appropriate on one type of hard disk drive 1 will be inappropriate on another type of hard disk drive 1.

In general, random number generator will not have the prior knowledge of the nature of the hard disk drive 1 in any given computer apparatus. This makes it difficult to select an appropriate address for the disk access. If an inappropriate disk access is chosen this may reduce the amount of rotation and hence the degree of randomness present in the time measurement. Ultimately this impacts on the overall speed of generation of the random numbers as it increases the number of disk access time measurements needed to derive random numbers with a sufficiently uniform probability distribution.

Another problem associated with the use of the disk access time of a hard disk drive is the fact that hard disk drives commonly employ cache memories incorporated in the hard disk drive 1 to cache data stored on the platter 2. On receiving a command to read data, if the data is available in the cache memory then the hard disk drive 1 retrieves the data from the cache memory instead of performing a physical access to the platter 2. This is known as a cache seek and reduces the disk access time. This is highly advantageous in speeding up operation of the hard disk drive 1 during normal operation.

On the other hand, a cache memory creates a problem when the disk access time of the hard disk drive is used as an entropy source for random number generation because a cache seek is not a good entropy source as the time taken is not sufficiently random. In principle, this problem can be tackled by rejecting disk access time measurements which are sufficiently short to be indicative of a retrieval of data from the cache rather from the platter 2 and/or by initially filling the cache memory (eg by making preliminary accesses before measuring the disk access time). However, both of these techniques effectively slow the rate at which useful disk access time measurements can be taken and hence reduce the speed of random number generation. It would be desirable to limit this reduction in the speed of random number generation arising from the presence of a cache in a hard disk drive.

BRIEF SUMMARY OF THE INVENTION

The present invention has three different aspects which themselves deal with different aspects of the problems discussed above.

A first aspect of the present invention is concerned with the problem of selecting appropriate addresses for performance of a disk access.

According to a first aspect of the present invention, there is provided a method of generating a random number using a hard disk drive, the method comprising:

making a plural number of disk access time measurements by repeatedly:

generating a random address on the hard disk drive using a pseudo-random number generator; and controlling the hard disk drive to access the sector of the hard disk drive at the generated random address and measuring the disk access time taken by the hard disk drive to access the sector; and performing a deskewing process on the plural number of disk access time measurements which results in a random number.

This method involves the use of disk access time measurements of a hard disk drive as an entropy source for random number generation. The addresses for the disk accesses are selected randomly using a pseudo-random number generator. As a result, the disk accesses are performed at addresses which are spread randomly over the disk drive, or at least over part of the disk drive. This means that on average the rotation of the platter in respect of each disk access is approximately half a full rotation. This is achieved irrespective of the nature of the hard disk drive being used. This means that the method is reliable and can be performed without any consideration of the nature of the hard disk drive. As the rotation is on average half a rotation of the platter, the disk access time measurements together provide a high degree of randomness. This technique of selecting addresses is therefore powerful and reliable for any type of hard disk drive.

The second aspect of the present invention is concerned with the problem discussed above of limitations arising from the operation of a cache memory associated with the hard disk drive.

According to a second aspect of the present invention, there is provided a method of generating a random number using a hard disk drive which has a cache memory associated therewith, the method comprising:

making a plural number of disk access time measurements by repeatedly sending a read-verify command to the hard disk drive to perform a read-verify operation of reading and verifying the data stored in a sector of the hard disk drive without returning the data, and measuring the disk access time taken by the hard disk drive to perform the read-verify operation; and performing a deskewing process on the plural number of disk access time measurements which results in a random number.

This method involves use of a disk access time measurements of a hard disk drive as the entropy source for random number generation. In particular, the disk access employed is a read-verify operation implemented by sending a read-verify command to the hard disk drive. The read-verify operation causes the hard disk drive to read and verify the data stored in a sector of the hard disk drive without returning the data. The method relates to the case where the hard disk drive has a cache memory associated with it, this being the case in most if not all hard disk drives. In most hard disk drives use of a read-verify operation ensures that a physical access to the platter of the hard disk drive is made without mere performance of a cache seek. Thus each disk access time measurement has a degree of randomness arising from the rotation of the platter and this avoids the limitations associated with a cache seek as discussed above.

The third aspect of the present invention is concerned with the problem discussed above of limitations arising from the operation of a cache memory associated with the hard disk drive.

According to a third aspect of the present invention, there is provided a method of generating a random number using a hard disk drive which has a cache memory associated therewith and is operable to perform a read-ahead operation of reading the data in sectors ahead of a sector which is the subject of an access command, the method comprising:

disabling the hard disk drive from performing said read-ahead operation;

making a plural number of disk access time measurements by controlling the hard disk drive to access a sector of the hard disk drive and measuring the disk access time taken by the hard disk drive to access the sector, and performing a deskewing process on the plural number of disk access time measurements which results in a random number.

This method uses disk access time measurements of a hard disk drive as an entropy source in random number generation. The method takes advantage of the fact that many hard disk drives have a cache memory providing the function of a read-ahead operation of reading the data in sectors ahead of the sector which is the subject of an access command such as a read command or a write command. The present method involves disabling such a read-ahead feature whilst making the disk access time measurements from which the random number is generated. This in effect limits the amount of data stored in the cache memory, which in turn reduces the risk of the disk access involving retrieval of data stored from the cache memory instead of a physical access to the platter of the hard disk drive involving rotation of the platter from which randomness is derived.

This method is particularly advantageous when used in combination with the first aspect of the present invention. In this case, as the amount of data stored in the cache memory is reduced there is a much lower chance of the random address in respect of which the disk access is made being an address of data stored in the cache memory. Despite this, the method is generally applicable to disk accesses made in respect of addresses generated in any manner. This is because in general it is not known what data is stored in the cache memory when the disk access time measurements are taken. This depends on the nature of the caching algorithm implemented in the hard disk drive and often also on the prior history of accesses made to the hare disk drive, neither of which are a priori known.

The methods in accordance with the second and third aspects of the present invention may be implemented in combination with the first aspect of the invention. They may also be implemented in a controller for the hard disk drive.

DETAILED DESCRIPTION OF THE INVENTION

Figure 2:
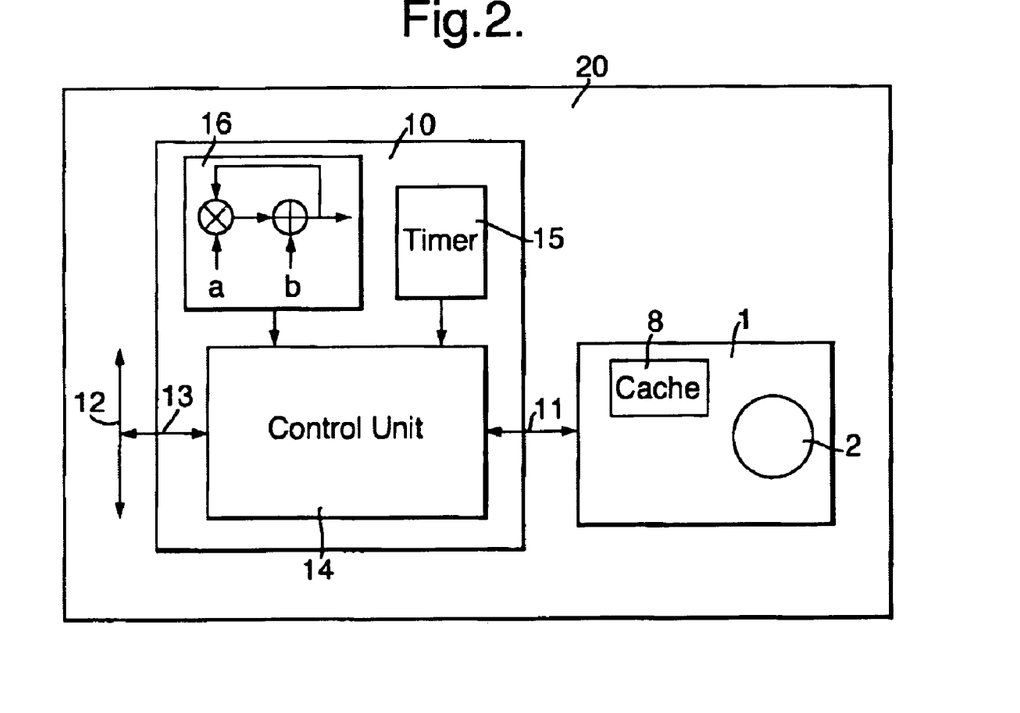
FIG. 2 is a diagram of a hard disk drive controller.

To allow better understanding, an embodiment of the present invention will now be described by way of non-limitative example with reference to the accompanying drawings A controller 10 for a hard disk drive 1 in a computer apparatus 20 is shown in FIG. 2.

The hard disk drive 1 is of a conventional design as shown in FIG. 1. The comments made above about the configuration and operation of the hard disk drive 1 apply equally to this embodiment of the invention. The hard disk drive 1 also incorporates a cache memory 8.

The controller 10 communicates with the main bus 12 of the computer apparatus 20 over an bus interface 13. The controller 10 communicates with the hard disk drive 1 over a drive interface 11 in accordance with the ATA standard, e.g. S-ATA. The controller 10 controls the hard disk drive 1, including accesses (e.g. reads and writes) to the hard disk drive 1, by sending commands to the hard disk drive 1 over the drive interface 11. The hard disk drive 1 operates in response to such commands.

In general, the hard disk drive 1 may be of many different types, for example supplied by different manufacturers. Indeed, in most computer apparatuses, the hard disk drive 1 may be replaced. Thus, the controller 10 needs to be operable without knowledge of nature and operating characteristics of the hard disk drive, for example the arrangement of sectors of data on the platter 2, the speed of rotation of the platter 2, and the configuration and operation of the cache memory 8.

Whilst the operation of the cache memory 8 may vary, generally speaking the following comments apply to most types of hard disk drive 1. The hard disk drive 1 uses the cache memory 8 to cache data which is the subject of accesses to the platter 2. In response to a read command instructing the hard disk drive 1 to read data of a specified address, the hard disk drive 1 first checks if the data of the specified address is already stored in the cache memory 8. If so, the hard disk drive 1 retrieves the data from the cache memory 8 for return back to the controller 10. This is known as a cache seek. The purpose is to reduce the disk access time required to read data, because the data may be returned without the need to perform a physical access of the data from the platter 2 involving movement of the head 3 to the sector of the specified address. On the other hand, if the data specified in a read command is not stored in the cache, then the physical retrieval from the platter 2 involving movement of the head 3 to the sector of the specified address must nonetheless be performed. In general, the hard disk drive 1 could implement any algorithm for storing data in the cache, but typically the hard disk drive 1 implements a read-ahead feature having the following characteristics. In response to a read command to access data in a sector of an address specified in the command, the head disk drive 1 will not only perform the access to the sector of the specified address, but will also read sectors of data at subsequent addresses and store this read data in the cache memory 8. This is implemented simply by continuing the rotation of the platter 2. This is an effective caching algorithm because of the observation that in practice reads are often performed for a series of consecutive addresses. Thus there is a high probability following a read command specifying a given address of a subsequent read command specifying subsequent addresses. Where is occurs, the subsequent command can be met by retrieving the data from the cache memory 8 (i.e. a cache seek).

The use of the cache memory 8 is highly advantageous in normal operation in reducing the disk access time, but creates a difficulty when the disk access time of the hard disk drive 1 is used as an entropy source for random number generation. This is because a cache seek does not involve any physical access of the head 3 to a sector of the platter 2 requiring the rotation of the platter 2 from which randomness is derived. To the contrary, the time required for a cache seek is highly constant and the randomness in such a cache seek time, if any, is very low. A cache seek is not a good entropy source for random number generation. This potential difficulty is avoided by the controller 1 as described further below.

Another point of note is that data is stored in the cache memory 8 in segments which are typically larger than a sector of the platter 2. An entire segment of the cache memory 8 is read to or written from in a single read or write operation.

The controller 10 is arranged as follows. The controller 10 incorporates a control unit 14, a timer 15 and a pseudo-random number generator 16. The timer 15 is a high accuracy watch-dog timer, typically having a clock frequency of 50 MHz which provides sufficient accuracy for a physical read in milliseconds. The pseudo-random number generator 16 is in this example a linear congruential pseudo-random number generator but could in general be any type of pseudo-random number generator, including a Mersenne twister.

The control unit 14 implements the control of the hard disk drive 1 for normal accesses, by issuing commands over the drive interface 11. In addition, the controller unit 14 of the controller 10 implements a random number generation function which may be performed in response to a command to the controller 10 from another component of the computer apparatus 20 received over the bus interface 13.

Figure 3:
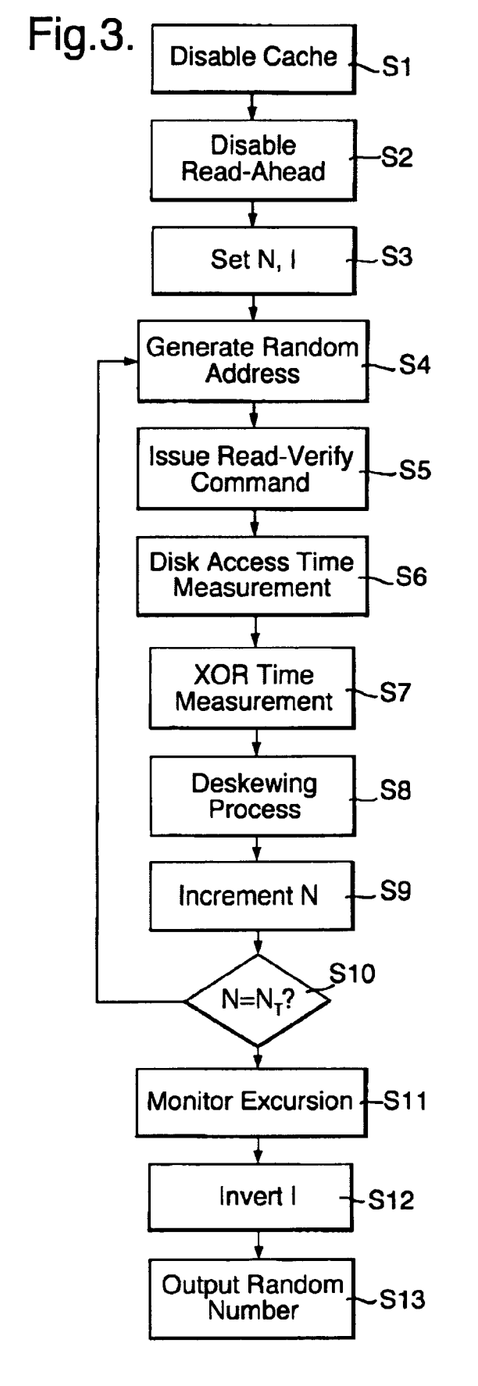
FIG. 3 is a flow chart of a random number generation operation of the controller.

In general terms, the random number generation involves (1) commanding the hard disk drive 1 to perform a plurality of disk accesses and measuring the disk access time (in steps S5 and S6) and (2) performing a deskewing process on the plurality of disk access time measurements to generate a random number (in steps S7 and S8). The random number generation process is shown in FIG. 3 involves the following steps.

In an initial step S1, the control unit 14 checks whether the hard disk drive 1 has available the feature of disabling the cache memory 8 and, if so, issues a command to the hard disk drive 1 to disable the cache memory 8. If available, this step prevents the hard disk drive 1 from performing the disk accesses by utilising a cache seek of retrieving the data from the cache memory 8. This means that the disk access time measurements used as the basis for the random number generation always involve a physical disk access including a rotational movement of the platter 2. However, for many disk drives 1, the feature of disabling the cache memory 8 is not available and so step S1 is omitted.

In a further initial step S2, it is checked whether the hard disk drive 1 has a read-ahead feature and, if so, the control unit 14 issues an ATA Set Feature command to disable the read-ahead feature. In response to this command, the hard disk drive 1 disables the read-ahead feature. As a result, when performing subsequent disk accesses the hard disk drive 1 will not perform the read-ahead operation of reading into the cache memory 8 of data in sectors ahead of the address specified in an access command received by the hard disk drive 1. This reduces the amount of data stored in the cache memory 8. Even where the hard disk drive 1 caches the data in the sector of an address specified an access command, each sector of cached data will be stored in a separate segment of the cache memory 8. As the segments of the cache memory 8 are larger than a sector of data, this means that the remaining portion of each segment of the cache memory 8 will not contain cached data. Thus, only a proportion of the total capacity of the cache memory 8 is used. As discussed further below, this reduces the chance of a command for a disk access being fulfilled by a cache seek.

In fact step S2 may optionally be omitted in view of the use of the read-verify command in step S5, as discussed further below.

In step S3, a counter N is set to zero and intermediate variable I is set to an initial value. Counter N counts the number of disk accesses performed in the random number generation operation. The intermediate variable I is processed in the deskewing process implemented in step S11 as described below to generate the output random number. In this example, the output random number has a binary value and hence the intermediate variable I has a binary value. The initial value of the intermediate variable I may be set to either 0 or 1, or may be the value retained from the previous performance of the random number generation process. Thus, in this example a random bit is generated, but the method could be generalised to provide a random number of any number of bits.

In step S4, the control unit 14 takes the output of the pseudo-random number generator 16 and uses it to generate a random address in the hard disk drive 1. In one alternative, the random address may be any address of the hard disk drive 1. In another alternative, the random address may be any address in a predetermined portion of the address space of the hard disk drive 1. Due to the nature of pseudo-random number generation, the random address is random in the sense that it cannot be predicted from the previous address and so the sequence of successively generated random addresses changes every time step S4 is performed.

In step S5, the control unit 14 sends an ATA Read Verify command, for example a Read Verify Extension command, to the hard disk drive 1 specifying the random address generated in step S4. The Read Verify command is a type of access command instructing the hard disk drive 1 to access the sector of the specified address. As the Read Verify command is issued, the control unit 14 starts the timer 15.

The command could alternatively be any other type of access command, for example a read command or a write command, but particular advantage is achieved by the use of a Read Verify command. A Read Verify command instructs the hard disk drive 1 to read the data stored in the sector of the hard disk drive 1 of the specified address and to verify that data, for example by performing an error check. This causes the hard disk drive 1 to move the head 3 to access the sector of the specified address, thereby involving a rotation of the platter 2 which is the source of randomness used in the random number generation. After the verification, the hard disk drive 1 returns a response to the controller 10. Thus in most types of hard disk drive 1 the operation performed in response to the Read-Verify command ensures a physical access to the platter 2 without just performing a cache seek. This is to ensure that the Read-Verify operation physically checks the disk and is required by the ATA/ATAPI-6 standard. Thus use of the Read-Verify command prevents the accesses being implemented by cache seeks from the cache memory 8 which would not provide a good degree of randomness. If measures were put in place to reject such cache seeks, this would slow down the entire process of generating a random number.

As such step S2 is unnecessary provided that the hard disk drive 1 does operate in response to the Read-Verify command without just performing a cache seek, which is the case for most types of hard disk drive 1. Therefore step S2 may optionally be omitted or may be retained as a precaution in case the hard disk drive 1 does operate in response to the Read-Verify command by performing a cache seek. Equally step S2 would be useful in the case of random number generation using some other type of access such as a read which could be implemented by the hard disk drive 1 by a cache seek.

As the process involves accessing a random address generated in step S4, the degree of rotation of the platter 2 varies randomly each time step S5 is performed but is on average half a rotation of the platter 2. Thus, the technique of performing disk accesses to sectors of random addresses ensures that a series of successive disk access time measurements have, as a whole, a good degree of randomness. This is achieved whatever the arrangement of the sectors on the platter 2. The controller 10 does not need to utilise any knowledge of the nature of the hard disk drive 1. Thus, the addresses for the disk accesses are selected in a manner which reliably provides a good degree of randomness whatever the type of the hard disk drive 1. This good degree of randomness effectively provides a good overall speed of random number generation by minimising the number of disk access time measurements used.

In step S6, the control unit 14 monitors receipt of the response from the hard disk drive 1. When the response is received, the control unit 14 takes the output of the timer 15 as the disk access time measurement. Accordingly, steps S5 and S6 together have the effect that the control unit 14 controls the hard disk drive 1 to access the sector of the disk drive and to measure the disk access time.

In step S7, the control unit 14 converts the disk access time measurement from step S6 into a binary number by performing an exclusive-OR operation on the bits of the disk access time measurement. This effectively mixes the bits of the disk access time measurement. Whilst this particular conversion process is advantageous due to being simple and straightforward to implement, in general any conversion process could be applied in step S7.

In step S8, there is performed an exclusive-OR operation on the disk access time measurement output from step S7 and the intermediate variable I to derive a new value of the intermediate variable I. This process updates the intermediate variable I.

Steps S9 and S10 cause steps S4 to S8 to be repeated to perform a plural number $N_T$ of excess time measurements. In step S9, the counter N is incremented and in step S10, it is determined whether the counter N has reached the value $N_T$. If not then the process returns to step S4 to acquire a further disk access time measurement. However, when it is determined in step S10 that $N_T$ disk access time measurements have been obtained, the process leaves the loop and proceeds to step S11. Subject to the processing in steps S11 and S12, this results in the final value of the intermediate variable I being output in step S13 as the generated random number. As a result of step S8 being repeated in each loop, the final value of the intermediate variable I is the result of forming an exclusive-OR operation on all the disk access time measurements. As an alternative to performing step S8 in each loop, it would alternatively be possible to store the plural number $N_T$ of disk access time measurements in each loop and subsequently to perform an exclusive-OR operation, but this would increase the memory requirement.

Steps S11 and S12 use a counter C which represents the excursion from an unbiased distribution of random numbers successively generated when the method of FIG. 3 is repeatedly performed. The value of the counter C is maintained without being reset between each repeated performance of the method of FIG. 3.

In step S11, the counter C is monitored to determine whether the magnitude of the counter C exceeds a predetermined threshold. In response to the magnitude of the counter C exceeding the predetermined threshold, the value of the intermediate value I from step S8 is inverted.

In step S12, the counter C is incremented if the intermediate value I from step S8 (which may or may not have been inverted in step S11) has a value one and is decremented if the intermediate value I from step S8 (which may or may not have been inverted in step S11) has a value 1 zero. In this manner, the magnitude of the counter C represents the excursion from an unbiased distribution of random numbers successively generated when the method of FIG. 3 is repeatedly performed, because an unbiased distribution will tend to maintain the value of the counter C at zero.

Considering steps S11 and S12 together, it will be seen that the effect is to invert the subsequently generated random numbers when the excursion of the previously generated random numbers from an unbiased distribution exceeds the predetermined threshold. This tends to limit the effect of any bias in the generated random numbers which causes an excursion from an unbiased distribution. If such bias exists, then the excursion will tend to drift in one direction until the threshold is reached. Then the inversion of subsequent generated random numbers will mean that the bias causes the excursion to tend to drift in the other direction.

Steps S11 and S12 are performed in this order so that the inversion of the currently generated random number is dependent solely on the excursion of the previous generated random numbers without consideration of the currently generated random number. If step S12 was performed before step S11, then the result would simply be to limit the value of the excursion. Instead, by performing step S11 before step S12, the inversion merely inverts the distribution of the random disk access time measurements.

The random number represented by the final value of the intermediate variable I is output in step S13. This random number can be stored in a memory within the controller 10 or can be supplied over the bus 12 to the other components of the computer apparatus 20 which requested the random number. The process of FIG. 3 is repeated to generate plural random bits.

As will be appreciated, the exclusive-OR operation implemented in step S8 constitutes a deskewing process which results in a random number. The use of an exclusive-OR operation as the deskewing process is advantageous because it is simple and straightforward to implement. However, in principle any other deskewing process could alternatively be implemented.

The selection of the value $N_T$ which is the number of disk access time measurements used in the random number generation operation of FIG. 3 will now be considered. In general terms, as the value $N_T$ increases, the uniformity of the distribution of the values of the random number generated by the operation of FIG. 3 is improved. As a general proposition, regardless of the bias $\epsilon$ in the distribution of the disk access time measurements (i.e. so that the probabilities of obtaining values of the disk access time measurements of 0 and 1 are respectively $0.5+\epsilon$ and $0.5-\epsilon$), the bias in the distribution of the generated random number can be driven down under any specified bound $\eta$ (i.e. so that the probabilities of the random number having a value of 0 or 1 is respectively $0.5+\eta$ or $0.5-\eta$) by raising the value $N_T$ to an appropriate level. It has been discovered that for typical types of hard disk drive 1, the random number generation operation described above can produce a random bit with a maximum allowed bias $\eta$ of $2^{-80}$ by using values $N_T$ of around 8 to 32, depending on the nature of the hard disk drive 1.

The value $N_T$ depends on the nature of the hard disk drive 1 because the bias $\epsilon$ in the distribution of the disk access time measurements depends on the physical properties of the hard disk drive 1 and in particular of the head 3 and actuator arm 4 which affect the degree of air turbulence when the platter 2 rotates. In general, the controller 10 is operable with a variety of different types of hard disk drive 1 and so the question arises as to how to select the value of $N_T$.

One option is to use a preset value of $N_T$ which is sufficiently high to be appropriate for any type of hard disk drive 1. Using the operation of FIG. 3 described above, a suitable value of $N_T$ might be 32, 35 or 40 to achieve a bias in the generated random number of at most $2^{-80}$. The value $N_T$ might be raised/lowered to reduce/increase the allowed bias in the generated random number.

However, with the option of using a preset value for $N_T$ for many types of hard disk drive 1 more disk access time measurements are made than is necessary so the speed of random number generation is lower than necessary. To deal with this, a second option is to monitor the actual distribution of the disk access time measurements and to select the value $N_T$ based thereon.

Figure 4:
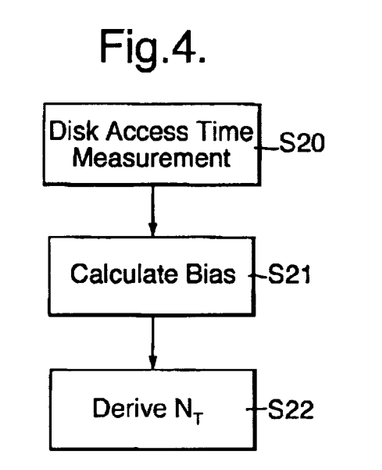
FIG. 4 is a flow chart of an initialisation operation of the controller.

One way to implement this second option is to perform an initialization process which is shown in FIG. 4 and will now be described.

The initialization process of FIG. 4 is performed periodically when the hard disk drive 1 is not being used. Thus, the initialization process does not affect the time taken to generate a random number following a request for this feature. The first step S20 of the initialization process is to make a plurality of disk access time measurements. This may be achieved by performing steps S4 to S7 of the random number generation operation of FIG. 3. The distribution of the disk access time measurements is monitored, for example by maintaining a count of each possible value of the disk access time measurement. As it is desired to monitor the random distribution, the number of disk access time measurements is very large, typically at least an order of magnitude greater than the value $N_T$ used in the random number generation operation of FIG. 3.

In step S21, the bias of the results is calculated from the distribution of the disk access time measurements 1 monitored in step S20. Then, in step S22 the value $N_T$ is calculated based on the bias calculated in step S21. For example, the value $N_T$ may be selected to have a value greater than $\log(2\eta)/\log(2\epsilon)$ where $\epsilon$ is the bias of the disk access time measurements and $\eta$ is the bound on the desired bias of the random number generation.

As an alternative to performing the initialization process of FIG. 4, the distribution of the disk access time measurements may be monitored during normal random number generation operation of FIG. 3, and used for deriving the bias $\epsilon$ and the value $N_T$.

While the random number generation described above uses disk access time measurements of the hard disk drive 1 as the sole entropy source in the generation of a random number, it will be appreciated that the random number could be generated additional using a further entropy source available in the computer apparatus 20. In this case, the disk access time measurements can be mixed with the measurements derived from the other entropy source. Such mixing of measurements of different entropy sources is in itself known.

Another possible variation is additional inputs can be used to personalise the output of the random number generator. Such additional inputs might be: the time or date; the intended use of the data or other user-supplied information; data that is necessary to control the internal functionality of the random number generator, such as commands; time variant parameters such as a clock, and/or information which is specific to the user. Such additional inputs are mixed with the disk access time measurements to generate the random number. These additional inputs change the generated random numbers, but do not necessarily introduce any additional degree of randomness.

The random numbers generated by the controller 10 may be used by the computer apparatus 20 in a number of different applications. The primarily intended application is a cryptographic application. In this case, the random number generated by the controller 10 may be used as the seed for a pseudo-random number generator to generate a longer sequence of random numbers. Optionally, such a pseudo-random number generator may be incorporated into the controller 10 or another component of the computer apparatus 20. However, the generated random number of equally be applied to other applications in the computer apparatus 20 requiring a random number.

The invention claimed is:

1. A method of generating a random number using a hard disk drive, the method comprising:
    making a plural number of disk access time measurements by repeatedly:
        generating a random address on the hard disk drive using a pseudo-random number generator; and
        controlling the hard disk drive to access the sector of the hard disk drive at the generated random address and measuring the disk access time taken by the hard disk drive to access the sector; and
    performing a deskewing process on the plural number of disk access time measurements which results in a random number.

2. A method according to claim 1, wherein
    the hard disk drive has a cache memory associated therewith, and
    the step of controlling the hard disk drive to access the sector of the hard disk drive at the generated random address comprises sending a read-verify command to the hard disk drive to perform a read-verify operation of reading and verifying the data stored in a sector of the hard disk drive at the generated random address without returning the data.

3. A method according to claim 2, wherein the read-verify command is a Read Verify Sector command in accordance with the ATA standard.

4. A method according to claim 3, wherein the read-verify command is a Read Verify Sector Extension command in accordance with the ATA standard.

5. A method according to claim 1, wherein
    the hard disk drive has a cache memory associated therewith and is operable to perform a read-ahead operation of reading the data in sectors ahead of a sector which is the subject of an access command, and
    the method further comprises disabling the hard disk drive from performing said read-ahead operation before making a plural number of disk access time measurements.

6. A method according to claim 5, wherein said step of disabling the hard disk drive from performing said read-ahead operation comprises sending a disabling command to the hard disk drive.

7. A method according to claim 6, wherein the disabling command is a Set Feature command in accordance with the ATA standard.

8. A method according to claim 1, wherein the method further comprises rejecting disk access time measurements which are below a predetermined threshold indicative of the access being performed by extracting data from a cache associated with the hard disk drive.

9. A method according to claim 1, further comprising converting each disk access time measurement into a binary number, the step of performing a deskewing process on the plural number of disk access time measurements being performed on the converted disk access time measurements.

10. A method according to claim 9, wherein the step of converting each disk access time measurement into a binary number comprises performing an exclusive-OR operation on the bits of each disk access time measurement.

11. A method according to claim 1, wherein the random number is a binary number.

12. A method according to claim 11, wherein said deskewing process comprises performing an exclusive-OR operation on the plural number of disk access time measurements.

13. A method according to claim 1, wherein the method is repeated to generate a series of random numbers and the deskewing process further comprises monitoring the excursion of successively generated random numbers from an unbiased distribution, and, in response to the excursion exceeding a predetermined threshold, inverting subsequently generated random numbers.

14. A method of generating a random number using a hard disk drive which has a cache memory associated therewith, the method comprising:
    making a plural number of disk access time measurements by repeatedly sending a read-verify command to the hard disk drive to perform a read-verify operation of reading and verifying the data stored in a sector of the hard disk drive without returning the data, and measuring the disk access time taken by the hard disk drive to perform the read-verify operation; and performing a deskewing process on the plural number of disk access time measurements which results in a random number.

15. A method according to claim 14, wherein the read-verify command is a Read Verify Sector command in accordance with the ATA standard.

16. A method according to claim 15, wherein the read-verify command is a Read Verify Sector Extension command in accordance with the ATA standard.

17. A method according to claim 14, wherein the method further comprises rejecting disk access time measurements which are below a predetermined threshold indicative of the access being performed by extracting data from a cache associated with the hard disk drive.

18. A method according to claim 14, further comprising converting each disk access time measurement into a binary number, the step of performing a deskewing process on the plural number of disk access time measurements being performed on the converted disk access time measurements.

19. A method according to claim 18, wherein the step of converting each disk access time measurement into a binary number comprises performing an exclusive-OR operation on the bits of each disk access time measurement.

20. A method according to claim 14, wherein the random number is a binary number.

21. A method according to claim 20, wherein said deskewing process comprises performing an exclusive-OR operation on the plural number of disk access time measurements.

22. A method according to claim 14, wherein the method is repeated to generate a series of random numbers and the deskewing process further comprises monitoring the excursion of successively generated random numbers from an unbiased distribution, and, in response to the excursion exceeding a predetermined threshold, inverting subsequently generated random numbers.

23. A method of generating a random number using a hard disk drive which has a cache memory associated therewith and is operable to perform a read-ahead operation of reading the data in sectors ahead of a sector which is the subject of an access command, the method comprising:
  disabling the hard disk drive from performing said read-ahead operation;
  making a plural number of disk access time measurements by controlling the hard disk drive to access a sector of the hard disk drive and measuring the disk access time taken by the hard disk drive to access the sector, and
  performing a deskewing process on the plural number of disk access time measurements which results in a random number.

24. A method according to claim 23, wherein said step of disabling the hard disk drive from performing said read-ahead operation comprises sending a disabling command to the hard disk drive.

25. A method according to claim 24, wherein the disabling command is a Set Feature command in accordance with the ATA standard.

26. A method according to claim 23, wherein the method further comprises rejecting disk access time measurements which are below a predetermined threshold indicative of the access being performed by extracting data from a cache associated with the hard disk drive.

27. A method according to claim 23, further comprising converting each disk access time measurement into a binary number, the step of performing a deskewing process on the plural number of disk access time measurements being performed on the converted disk access time measurements.

28. A method according to claim 27, wherein the step of converting each disk access time measurement into a binary number comprises performing an exclusive-OR operation on the bits of each disk access time measurement.

29. A method according to claim 23, wherein the random number is a binary number.

30. A method according to claim 29, wherein said deskewing process comprises performing an exclusive-OR operation on the plural number of disk access time measurements.

31. A method according to claim 23, wherein the method is repeated to generate a series of random numbers and the deskewing process further comprises monitoring the excursion of successively generated random numbers from an unbiased distribution, and, in response to the excursion exceeding a predetermined threshold, inverting subsequently generated random numbers.

32. A controller for controlling the operation of a hard disk drive, the controller being capable of generating a random number using the hard disk drive and comprising:
  a pseudo-random number generator;
  a timer;
  address generator operative to generate random addresses on the hard disk drive from the output of the pseudo-random number generator;
  a controller operative to repeatedly control the hard disk drive to access a sector of the hard disk drive at a random address generated by the address generator and to measure the disk access time taken by the hard disk drive to access the sector using the timer; and
  a deskewer operative to perform a deskewing process on a plural number of disk access time measurements made by the controller which results in a random number.

33. A controller according to claim 32, wherein
  the hard disk drive has a cache memory associated therewith, and
  the controller is operative to control the hard disk drive to access the sector of the hard disk drive at the generated random address by sending a read-verify command to the hard disk drive to perform a read-verify operation of reading and verifying the data stored in a sector of the hard disk drive at the generated random address without returning the data.

34. A controller according to claim 33, wherein the read-verify command is a Read Verify Sector command in accordance with the ATA standard.

35. A controller according to claim 34, wherein the read-verify command is a Read Verify Sector Extension command in accordance with the ATA standard.

36. A controller according to claim 32, wherein
  the hard disk drive has a cache memory associated therewith and is operable to perform a read-ahead operation of reading the data in sectors ahead of a sector which is the subject of an access command, and
  the controller is further operative to disable the hard disk drive from performing said read-ahead operation, and thereafter to repeatedly control the hard disk drive to access a sector of the hard disk drive.

37. A controller according to claim 36, wherein the controller is operative to disable the hard disk drive from performing said read-ahead operation by sending a disabling command to the hard disk drive.

38. A controller according to claim 37, wherein the disabling command is a Set Feature command in accordance with the ATA standard.

39. A controller according to claim 36, wherein the deskewing process which the deskewer is operative to perform comprises performing an exclusive-OR operation on the plural number of disk access time measurements.

40. A controller according to claim 32, wherein deskewer is operative to reject disk access time measurements which are below a predetermined threshold indicative of the access being performed by extracting data from a cache associated with the hard disk drive.

41. A controller according to claim 32, further comprising a converter operative to convert each disk access time measurement into a binary number, the deskewer being operative to perform the deskewing process on disk access time measurements converted by the converter.

42. A controller according to claim 41, wherein the converter is arranged to convert each disk access time measurement into a binary number by performing an exclusive-OR operation on bits of each disk access time measurement.

43. A controller according to claim 32, wherein the random number is a binary number.

44. A controller according to claim 32, further comprising a monitor operative to monitor the excursion of successively generated random numbers from an unbiased distribution, and, in response to the excursion exceeding a predetermined threshold, to invert subsequently generated random numbers.

45. A controller for controlling the operation of a hard disk drive which has a cache memory associated therewith, the controller being capable of generating a random number using the hard disk drive, the controller comprising:
    a timer;
    a controller operative to repeatedly send a read-verify command to the hard disk drive to perform a read-verify operation of reading and verifying the data stored in a sector of the hard disk drive without returning the data, and to measure the disk access time taken by the hard disk drive to perform the read-verify operation using the timer; and
    a deskewer operative to perform a deskewing process on a plural number of disk access time measurements made by the controller which results in a random number.

46. A controller according to claim 45, wherein the read-verify command is a Read Verify Sector command in accordance with the ATA standard.

47. A controller according to claim 46, wherein the read-verify command is a Read Verify Sector Extension command in accordance with the ATA standard.

48. A controller according to claim 45, wherein deskewer is operative to reject disk access time measurements which are below a predetermined threshold indicative of the access being performed by extracting data from a cache associated with the hard disk drive.

49. A controller according to claim 45, further comprising a converter operative to convert each disk access time measurement into a binary number, the deskewer being operative to perform the deskewing process on disk access time measurements converted by the converter.

50. A controller according to claim 49, wherein the converter is arranged to convert each disk access time measurement into a binary number by performing an exclusive-OR operation on bits of each disk access time measurement.

51. A controller according to claim 45, wherein the random number is a binary number.

52. A controller according to claim 51, wherein the deskewing process which the deskewer is operative to perform comprises performing an exclusive-OR operation on the plural number of disk access time measurements.

53. A controller according to claim 45, further comprising a monitor operative to monitor the excursion of successively generated random numbers from an unbiased distribution, and, in response to the excursion exceeding a predetermined threshold, to invert subsequently generated random numbers.

54. A controller for controlling the operation of a hard disk drive which has a cache memory associated therewith and is operable to perform a read-ahead operation of reading the data in sectors ahead of a sector which is the subject of an access command, the controller being capable of generating a random number using the hard disk drive, the controller comprising:
    a timer;
    a disabler operative to disable the hard disk drive from performing said read-ahead operation;
    a controller operative to repeated controlling the hard disk drive to access a sector of the hard disk drive after operation of the disabler and to measure the disk access time taken by the hard disk drive to access the sector using the timer; and
    a deskewer operative to performing a deskewing process on a plural number of disk access time measurements made by the controller which results in a random number.

55. A controller according to claim 54, wherein the disabler is operative to disable the hard disk drive from performing said read-ahead operation by sending a disabling command to the hard disk drive.

56. A controller according to claim 55, wherein the disabling command is a Set Feature command in accordance with the ATA standard.

57. A controller according to claim 54, wherein deskewer is operative to reject disk access time measurements which are below a predetermined threshold indicative of the access being performed by extracting data from a cache associated with the hard disk drive.

58. A controller according to claim 54, further comprising a convertor operative to convert each disk access time measurement into a binary number, the deskewer being operative to perform the deskewing process on disk access time measurements converted by the converter.

59. A controller according to claim 58, wherein the converter is arranged to convert each disk access time measurement into a binary number by performing an exclusive-OR operation on bits of each disk access time measurement.

60. A controller according to claim 54, wherein the random number is a binary number.

61. A controller according to claim 60, wherein the deskewer process which the deskewer is operative to perform comprises performing an exclusive-OR operation on the plural number of disk access time measurements.

62. A controller according to claim 54, further comprising a monitor operative to monitor the excursion of successively generated random numbers from an unbiased distribution, and, in response to the excursion exceeding a predetermined threshold, to invert subsequently generated random numbers.

* * * * *